United States Patent
Yaegashi

(10) Patent No.: US 10,789,715 B2
(45) Date of Patent: Sep. 29, 2020

(54) IMAGE PROCESSING DEVICE, IMAGE PROCESSING METHOD, AND INFORMATION STORAGE MEDIUM

(71) Applicant: Rakuten, Inc., Tokyo (JP)

(72) Inventor: Keita Yaegashi, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 245 days.

(21) Appl. No.: 15/980,744

(22) Filed: May 16, 2018

(65) Prior Publication Data

US 2018/0336684 A1 Nov. 22, 2018

(30) Foreign Application Priority Data

May 18, 2017 (JP) .................. 2017-098868

(51) Int. Cl.
*G06K 9/46* (2006.01)
*G06T 7/13* (2017.01)
*G06K 9/32* (2006.01)
*G06K 9/00* (2006.01)

(52) U.S. Cl.
CPC ............ *G06T 7/13* (2017.01); *G06K 9/00442* (2013.01); *G06K 9/3241* (2013.01); *G06K 9/4604* (2013.01); *G06T 2207/20172* (2013.01)

(58) Field of Classification Search
CPC ............ G06T 7/13; G06T 2207/20172; G06K 9/00442; G06K 9/3241; G06K 9/4604
See application file for complete search history.

(56) References Cited

U.S. PATENT DOCUMENTS

| | | | |
|---|---|---|---|
| 7,706,591 B2* | 4/2010 | Ramer | G06K 9/00127 382/133 |
| 8,189,962 B2* | 5/2012 | Ito | G06K 9/00369 345/619 |
| 8,736,858 B2* | 5/2014 | Mori | H04N 1/33315 358/1.13 |
| 9,179,130 B2* | 11/2015 | Fan | H04N 5/2256 |
| 9,236,027 B2* | 1/2016 | Ishida | G09G 5/10 |
| 10,026,206 B2* | 7/2018 | Zhang | G06F 3/0488 |
| 2017/0280017 A1* | 9/2017 | Namiki | H04N 1/4097 |

FOREIGN PATENT DOCUMENTS

| JP | 2002-215380 A | 8/2002 |
|---|---|---|
| JP | 2005-165790 A | 6/2005 |

OTHER PUBLICATIONS

Office Action dated Aug. 28, 2018, for corresponding JP Patent Application No. 2017-098868 and Partial translation thereof.

* cited by examiner

*Primary Examiner* — Gregory M Desire
(74) *Attorney, Agent, or Firm* — HEA Law PLLC

(57) ABSTRACT

Image obtaining means of an image processing device obtains an image including a background and an object. Specifying means specifies, based on a position of the object detected in the image, an area in which a number of pixels of the object on a straight line is less than a threshold value, or an area in which a number of pixels of the background on a straight line is equal to or more than the threshold value. Processing executing means executes processing to divide the image into a plurality of images based on the area specified by the specifying means.

13 Claims, 14 Drawing Sheets

IMAGE PROCESSING DEVICE, IMAGE PROCESSING METHOD, AND INFORMATION STORAGE MEDIUM

CROSS REFERENCE TO RELATED APPLICATIONS

This application claims priority from Japanese Patent Application 2017-098868, filed on May 18, 2017. The contents of the above document is incorporated herein by reference in its entirety.

TECHNICAL FIELD

The present invention relates to an image processing device, an image processing method, and an information storage medium.

BACKGROUND ART

It is known to generate an image including a plurality of pages. For example, Patent Literature 1 describes generating a leaflet, in which a plurality of pages are printed, by inserting photographs etc. in an image combining a template image and a background image.

CITATION LIST

Patent Literature

Patent Literature 1: JP2005-165790A

SUMMARY OF INVENTION

Technical Problem

For example, in Patent Literature 1, in a case where pages included in the image of the leaflet are divided into different images, the image might be divided at the folds indicated by a user in a screen displaying the leaflet image. However, in this case, the user manually indicates the positions of the folds, and thus, dividing the images of a lot of leaflets is very burdensome.

One or more, embodiments of the present invention have been conceived in view of the above, and an object thereof is to save labor in dividing an image.

Solution to Problem

In order to solve the above described problems, an image processing device according to the present invention includes image obtaining means for obtaining an image including a background and an object, specifying means for specifying, based on a position of the object detected in the image, an area in which a number of pixels of the object on a straight line is less than a threshold value, or an area in which a number of pixels of the background on a straight line is equal to or more than the threshold value, and processing executing means for executing processing to divide the image into a plurality of images based on the area specified by the specifying means.

An image processing method according to the present invention includes an image obtaining step of obtaining an image including a background and an object, a specifying step of specifying, based on a position of the object detected in the image, an area in which a number of pixels of the object on a straight line is less than a threshold value, or an area in which a number of pixels of the background on a straight line is equal to or more than the threshold value, and a processing executing step of executing processing to divide the image into a plurality of images based on the area specified in the specifying step.

A program according to the present invention causes a computer to function as image obtaining means for obtaining an image including a background and an object, specifying means for specifying, based on a position of the object detected in the image, an area in which a number of pixels of the object on a straight line is less than a threshold value based on a position of the object detected in the image, or an area in which a number of pixels of the background on a straight line is equal to or more than the threshold value, and processing executing means for executing processing to divide the image into a plurality of images based on the area specified by the specifying means.

According to an aspect of the present invention, the specifying means specifies, based on a position of an outline of the object detected by edge detection performed on the image, an area in which a number of pixels in the outline on a straight line is less than a threshold value, or an area in which a number of pixels that are on a straight line and not in the outline is equal to or more than the threshold value.

According to an aspect of the present invention, the specifying means specifies an area in which a number of pixels in the object on a straight line connecting one edge of the image to another edge of the image is less than a threshold value, or an area in which a number of pixels in the background on a straight line connecting one edge of the image to another edge of the image is equal to or more than the threshold value.

According to an aspect of the present invention, the straight line connecting one edge of the image to another edge of the image is a straight line in a longitudinal direction of the image or a straight line in a lateral direction of the image.

According to an aspect of the present invention, the processing is image processing for determining a dividing position of the image based on the area specified by the specifying means and displaying the determined dividing position on display means on which the image is displayed, and the image processing device further includes receiving means for receiving an operation to change the dividing position and dividing means for dividing the image based on the dividing position changed by the operation.

According to an aspect of the present invention, the processing is image processing for dividing the image into a plurality of images based on the area specified by the specifying means.

According to an aspect of the present invention, the processing executing means executes the processing based on a straight line in the area specified by the specifying means.

According to an aspect of the present invention, the processing executing means executes the processing based on a straight line at an edge of the area specified by the specifying means.

According to an aspect of the present invention, the processing executing means selects straight lines in the area specified by the specifying means so that a distance between the straight lines or a distance between the straight lines and an edge of the image is equal to or more than a predetermined distance, and executes the processing based on the selected straight lines.

According to an aspect of the present invention, the image processing device further includes adding means for adding, based on a distance between areas specified by the specifying means or a distance between the areas and an edge of the image, page numbers to image parts divided by the areas.

According to an aspect of the present invention, the image processing device further includes estimating means for estimating a number of total pages of the image parts based on the areas specified by the specifying means. The adding means adds page numbers to the image parts further based on the number of total pages estimated by the estimating means.

According to an aspect of the present invention, the image is an image of a leaflet that is opened, the object is content of the leaflet, the area specified by the specifying means includes a fold of the leaflet, and the processing is to divide the image into a plurality of images at a position of the fold in the area specified by the specifying means.

Effects of the Invention

According to the present invention, it is possible to save labor in dividing an image.

DESCRIPTION OF EMBODIMENTS

1. Hardware Configuration of Image Processing Device

Figure 1:
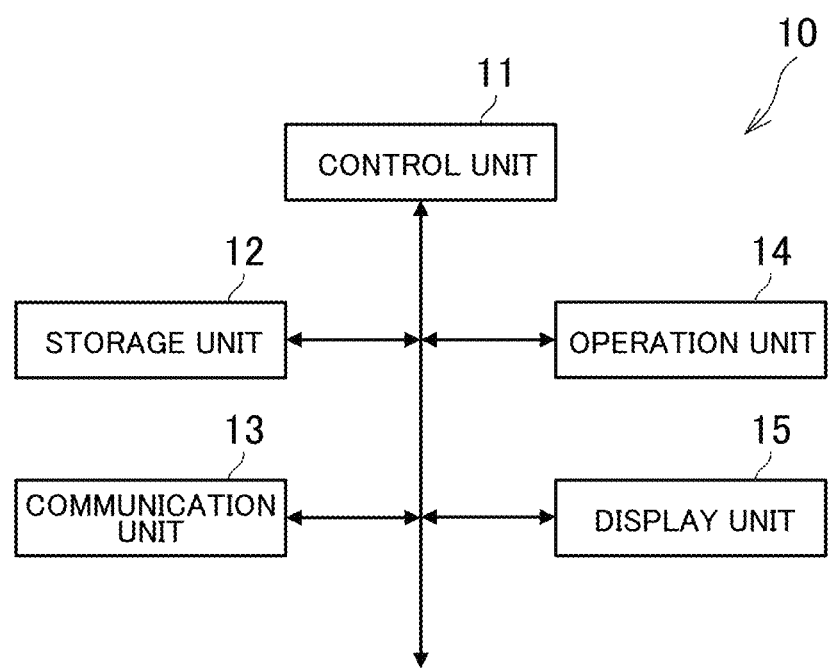
FIG. 1 is a diagram illustrating a hardware configuration of the image processing device.

An embodiment of an image processing device according to the present invention will be described below in detail. FIG. 1 is a diagram illustrating a hardware configuration of the image processing device. The image processing device 10 is a computer capable of image processing, such as a server computer, a personal computer, and a portable terminal (including a smartphone and a tablet computer). As shown in FIG. 1, the image processing device 10 includes a control unit 11, a storage unit 12, a communication unit 13, an operation unit 14, and a display unit 15.

The control unit 11 includes at least one microprocessor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a ROM, an EEPROM, a flash memory, and a hard disk. The communication unit 13 is a wired or wireless communication interface for data communications through a network. The operation unit 14 is an input device, and, for example, a pointing device, such as a touch panel and a mouse, a keyboard, and a button. The operation unit 14 transmits an operation of a user to the control unit 11. The display unit 15 is, for example, a liquid crystal display unit or an organic EL display unit. The display unit 15 displays a screen based on instructions from the control unit 11.

The programs or data described as being stored in the storage unit 12 may be provided through a network. The hardware configuration of the image processing device 10 is not limited to the above examples, and various types of hardware can be applied. For example, the hardware may include a reader (e.g., optical disc drive or memory card slot) for a computer-readable information storage medium, and an input/output unit (e.g., USB port) for inputting/outputting data to/from external devices. For example, programs and data stored in an information storage medium may be provided to the image processing device 10 through the reader or the input/output unit.

In this embodiment, a user indicates where to divide an image by using image editing software so as to divide the image in a leaflet into different pages and separately display the pages on an electronic brochure. At that time, with the assumption that folds of the leaflet are included in an area in which a character or a photograph is not shown, the image processing device 10 displays the folds on the image editing software, thereby assisting the user in editing. In the following, the configuration of the image processing device 10 will be described in detail.

2. Functions Implemented in Image Processing Device

Figure 2:
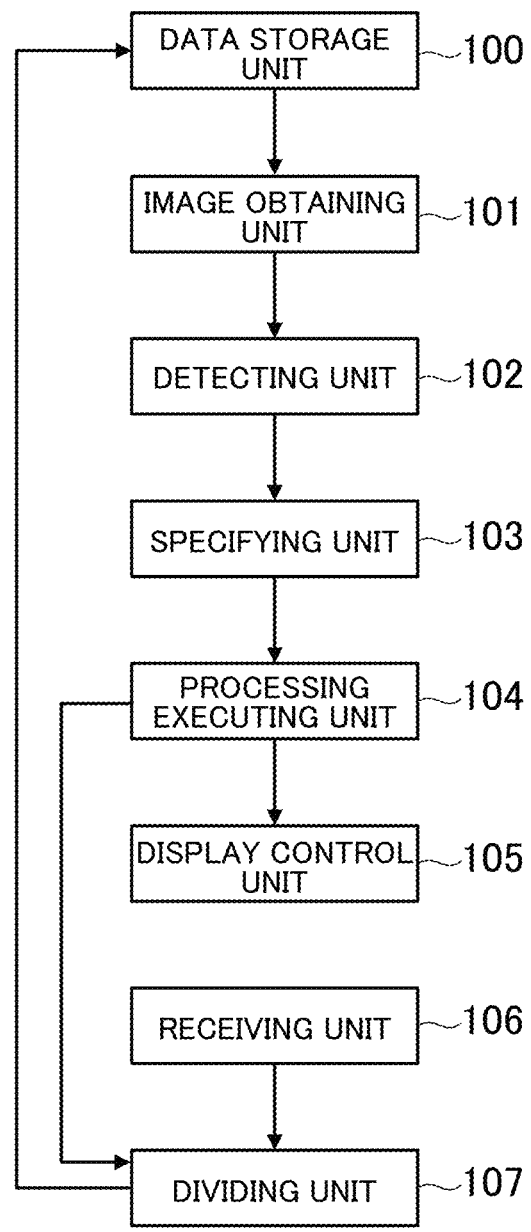
FIG. 2 is a functional block diagram showing an example of functions implemented, in the image processing device.

FIG. 2 is a functional block diagram showing an example of functions implemented in the image processing device 10. As shown in FIG. 2, the image processing device 10 includes a data storage unit 100, an image obtaining unit 101, a detecting unit 102, a specifying unit 103, a processing executing, unit 104, a display control unit 105, a receiving unit 106, and a dividing unit 107.

2-1. Data Storage Unit

The data storage unit 100 is implemented mainly by the storage unit 12. The data storage unit 100 stores an image including a background and an object. The image may be any image generated in any method, such as, an image read, by a scanner, an image on the paper captured by a camera, or an image generated by image editing software. For example, all of pixels in an image are a part of either a background or an object.

A background is, for example, a scene behind an object, and an area having a background color and a pattern. In other words, the background is an area other than the object, for example, and has no information (meaning) by itself. For example, if an image is generated by a scanner or a camera, a background may be an area representing a color of paper, an area representing a background color or a pattern printed on the paper, or an area where there is no paper (e.g., a cover of a scanner). For example, if an image is generated by image editing software, the background is an area representing a background color or a pattern specified by the image editing software. The background may be a photograph or a picture. In this case, the photograph or the picture is depicted in a more pale (lighter) color than a color of the object so as not to be noticeable.

The object is, for example, content depicted on the background, such as a character (writing), a photograph, and a picture. In other words, the object is an area having information (meaning) by itself. For example, if an image is generated by a scanner or a camera, the object is a character, a photograph, or a picture printed on paper. For example, if an image is generated by image editing software, the object is a character that is input by the image editing software, a photograph captured by the image editing software, or a picture drawn by the image editing software.

Figure 3:
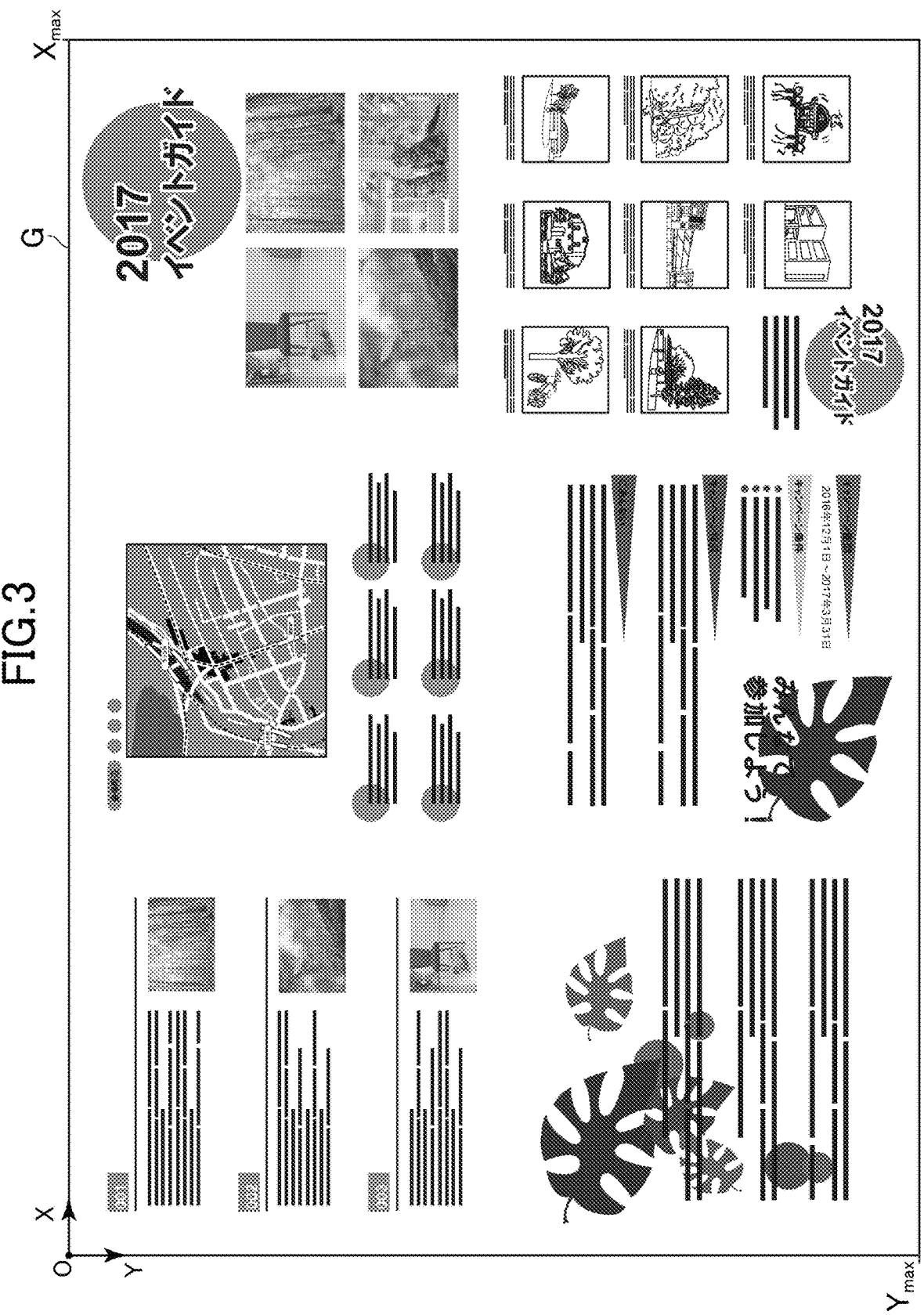
FIG. 3 is a diagram illustrating an example of an image.

FIG. 3 is a diagram illustrating an example of an image. In FIG. 3, coordinate axes (X axis-Y axis) with the origin O at the top-left corner of an image G are defined, and a position of each pixel is represented by two-dimensional coordinate system. In the image G of FIG. 3, Xmax pixels are arranged in the X-axis direction (lateral/horizontal/row direction), and Ymax pixels are arranged in the Y-axis direction (longitudinal/vertical/column direction). As shown in FIG. 3, in this embodiment, an image of an expanded leaflet will be described as an example of the image G.

A leaflet is, for example, a folded printed material. Unlike a single sheet of handout or flier, the leaflet can be divided into some parts by being folded over. That is, a sheet of a leaflet can be divided into a plurality of areas (printed side) by folds. In this embodiment, areas that are divided by folds are referred to as pages. In FIG. 3, the leaflet includes six pages on one side.

For example, a page is enclosed by folds, and thus the folds of the leaflet are edges or boundary lines of the pages. For example, a page includes printing area and a margin. The printing area is an area of a printed material where content, such as a main text, is printed, and the margin is an area where content is not printed. For example, the printing area is disposed around the center of a page (an area away from a fold or an edge by more than a predetermined distance), and the margin is disposed around a fold or an edge (an area away from a fold or an edge by less than a predetermined distance). The edges are an outline of a leaflet itself (edges of a sheet), and means edges of an image (top, left, right, and bottom edges). In other words, the printing area is enclosed by margins and includes a background and an object, and the margins surround the printing area and include only a background.

A leaflet is similar to a brochure, but in this embodiment, a leaflet is a single sheet of paper, while a brochure is formed of a plurality of sheets. The leaflet may be duplex printing, or single-side printing. In this embodiment, content of the leaflet (e.g., character, photograph, picture) corresponds to an object, and a part other than the content of the leaflet (e.g., a color of a sheet, a background color or a pattern printed on the sheet) corresponds to a background.

A variety of formats can be applied to the leaflet. The leaflet may include any number of pages, and ways of folding the leaflet and layout of pages (placement and orientations) are freely determined. In FIG. 3, a leaflet having six pages on one side of a sheet is taken as an example, although the number of pages on one side may be any number, such as two, four, and eight. For example, in a case of a duplex printed leaflet, the front side and the back side may have different number of printed page. The front side is a surface where the first page (front cover) when the leaflet is folded is printed, and the back side is a surface that is not the front side.

For example, in this embodiment, a case will be described in which the number of folds is three, although the number of folds may be any number, such as two and four. For example, a layout of pages may correspond to the number of pages and the way to fold the leaflet. In this embodiment, a layout of what we call direct-mail folding will be described, although any layout, such as double-folding, inside three-folding, outside three-folding, gatefold, outside four-folding, and inside four-folding, may be applicable.

Figure 4:
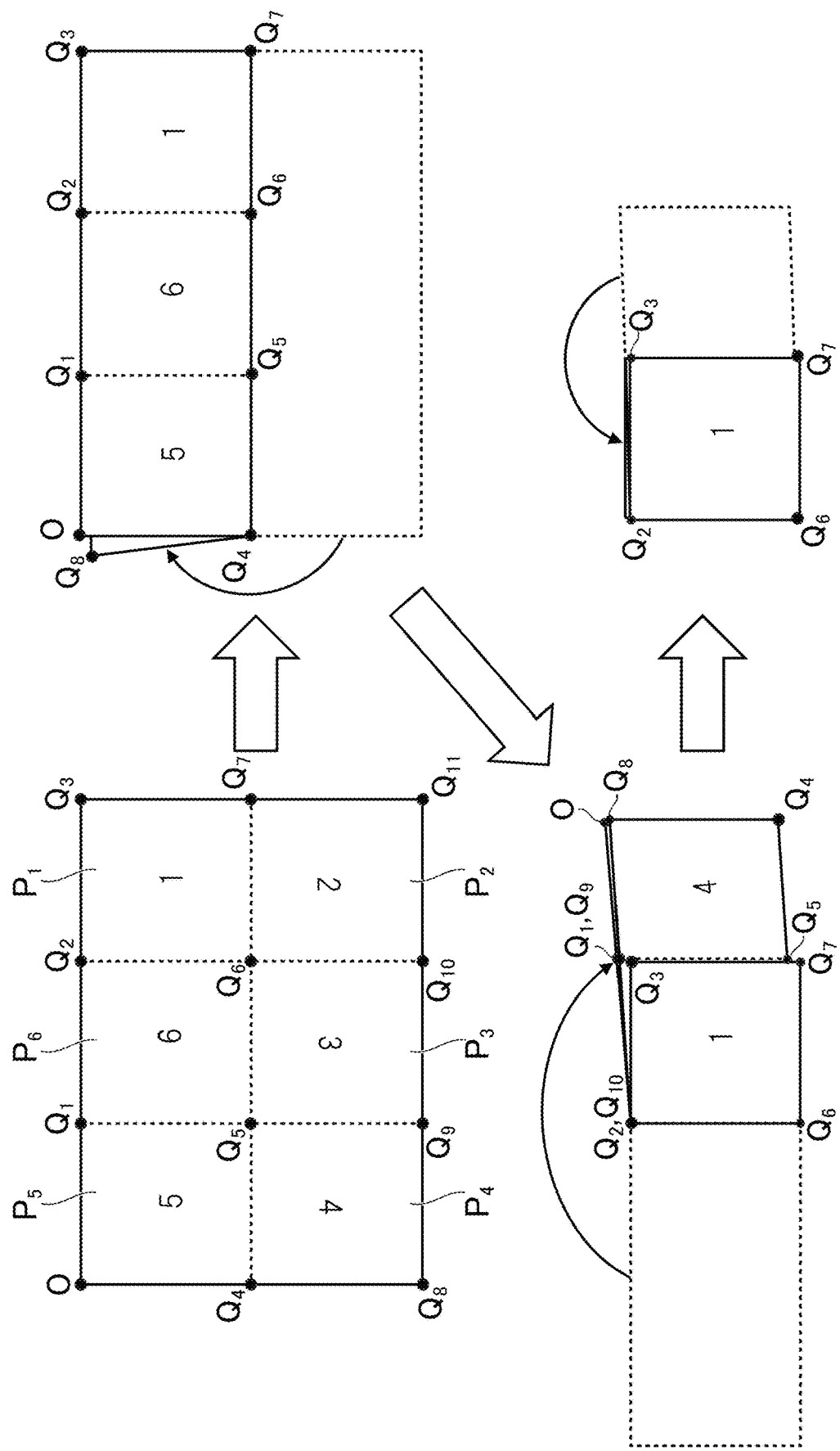
FIG. 4 is a diagram illustrating an example of a layout and a way of folding a leaflet.

FIG. 4 is a diagram illustrating an example of a layout and a way of folding a leaflet. In FIG. 4, detailed content of the leaflet, such as characters and photographs, are omitted, and boundaries of pages are schematically indicated in dotted lines. Numerical values in the leaflet indicate page numbers, and orientations of the numerical values indicate orientations of the pages. For example, the first page $P_1$, the fifth page $P_5$, and the sixth page $P_6$ are printed in the forward direction, and the second page $P_2$ to the fourth page $P_4$ are printed in the reverse direction. In the following, in a case where the first page $P_1$ to the sixth page $P_6$ are not necessarily distinguished, a page is simply described as a page P.

In FIG. 4, left-top, right-top, left-bottom, and right-bottom positions of the leaflet are a point O, a point $Q_3$, a point $Q_8$, and a point $Q_{11}$, respectively. Further, positions to divide the upper side of the leaflet into equal three parts are points $Q_1$ and $Q_2$, positions to divide the lower side of the leaflet into equal three parts are points $Q_9$ and $Q_{10}$, a position to divide the left side of the leaflet into equal two parts is a point $Q_4$, and a position to divide the right side of the leaflet into equal two parts is a point $Q_7$. An intersection of a line $Q_1Q_9$ and a line $Q_4Q_7$ is a point $Q_5$, and an intersection of a line $Q_2Q_{10}$ and a line $Q_4Q_7$ is a point $Q_6$. For example, folds of the leaflet are the line $Q_1Q_9$, the line $Q_2Q_{10}$, and the line $Q_4Q_7$, and pages P are areas divided by these folds.

The page numbers of the pages P indicate the order of the pages when the leaflet is folded. As such, on the image G, the pages P are not arranged in the order of page numbers. In FIG. 4, the upper half of the leaflet includes the fifth page $P_5$, the sixth page $P_6$, and the first page $P_1$ from the left, and the lower half of the leaflet, includes the fourth page $P_4$, the third page $P_3$, and the second page $P_2$ from the left.

As shown in FIG. 4, as a first step of folding the leaflet, the expanded leaflet is folded at the line $Q_4Q_7$ to make a mountain fold. In a second step, the leaflet, is folded at the line $Q_2Q_6$ (line $Q_{10}Q_6$ when viewed from the backside) to make a mountain fold. In a third step, the leaflet is folded at the line $Q_9Q_5$ (line $Q_1Q_5$ when viewed from the backside) to make a mountain fold.

With the tree steps above, the leaflet is folded with the first page $P_1$ being a front cover. When the first page $P_1$ of the folded leaflet is opened, the second page $P_2$ and the third page $P_3$ appear in this order from the left. When the leaflet is turned over, the fourth page $P_4$ appears. When the fourth page $P_4$ is opened, the fifth page $P_5$ and the sixth page $P_6$ appear. In the state where the leaflet is opened, the second page $P_2$ to the fourth page $P_4$ are printed in the reverse direction. Since the leaflet is folded back in the first step, these pages appear in the forward direction when being folded.

As described above, the data storage unit 100 of this embodiment stores the image G of the expanded leaflet. Various types of data formats, such as BMP, JPEG, PNG, and GIF, are applicable to the image G. Further, the number of colors of the image G may be freely determined, and any of a color image, a gray scale image, and a monochrome image may be applicable. The number of bits of a color image and a gray scale image is also freely determined, and, for example, a 24-bit RGB image and an 8-bit gray scale image may be applicable.

The data stored in the data storage unit 100 is not limited to the above example. For example, the data storage unit 100 may store images of the pages P divided by a dividing unit 107, which will be described later, in association with the image G. For example, the data storage unit 100 may store threshold values necessary for processing of a specifying unit 103, which will be described later.

2-2. Image Obtaining Unit

The image obtaining unit 101 is implemented mainly by the control unit 11. The image obtaining unit 101 obtains the image G including a background and objects. The image obtaining unit 101 of this embodiment obtains the image G in which pages P are disposed in a predetermined direction (e.g., at least one of a longitudinal direction and a lateral direction). In FIG. 3, the pages P of the image G are disposed in two columns of the upper and lower columns, although the pages P may be disposed in three or more columns, or in a single column instead of multiple columns.

In this embodiment, the data storage unit 100 stores the image G, and thus the image obtaining unit 101 obtains the image G stored in the data storage unit 100. If the image processing device 10 is connected to a scanner or a camera, the image obtaining unit 101 may directly obtain the image G from the scanner or the camera. For example, if the image G is stored in an information storage medium, such as a flash memory, or a database server, the image obtaining unit 101 may obtain the image G from the information storage medium or the database server.

2-3. Detecting Unit

The detecting unit 102 is implemented mainly by the control unit 11. The detecting unit 102 detects an object included in the image G. In other words, the detecting unit 102 classifies pixels of the image G into object pixels corresponding to the object and background pixels corresponding to the background.

The object pixels are pixels representing colors of the object, and the background pixels are pixels other than the object. pixels and representing colors of the background. In other words, the object pixels configure the object in the image G, and the background pixels configure the background in the image G.

Various known methods can be applied to the method of detecting the object. In this embodiment, edge detection is used. The edge detection is a method of detecting points (edges) in an image at which colors change sharply. Various types of edge detection methods, such as Canny, Sobel, and Laplacian methods are applicable.

For example, the detecting unit 102 performs edge detection on the image G, thereby detecting an outline of the object. For example, outlines of characters, photographs, and pictures printed in the leaflet (outlines of objects) are detected as edge pixels. The detecting unit 102 detects the edge pixels as pixels representing outlines of the objects. An edge pixel is an example of the object pixel, and a non-edge pixel is an example of the background pixel. As such, in this embodiment, an edge pixel can be replaced with an object pixel, and a non-edge pixel can be replaced with a background pixel.

For example, if the background has a single color, the background has no color change, and thus is detected as non-edge pixels. For example, if the background has a gradation, the background includes multiple colors, but is detected as non-edge pixels because the color change is gradual. On the other hand, if the background includes a predetermined pattern, the background is detected as non-edge pixels when the color change in the pattern is gradual, and is detected as edge pixels when the color change in the pattern is sharp.

Figure 5:
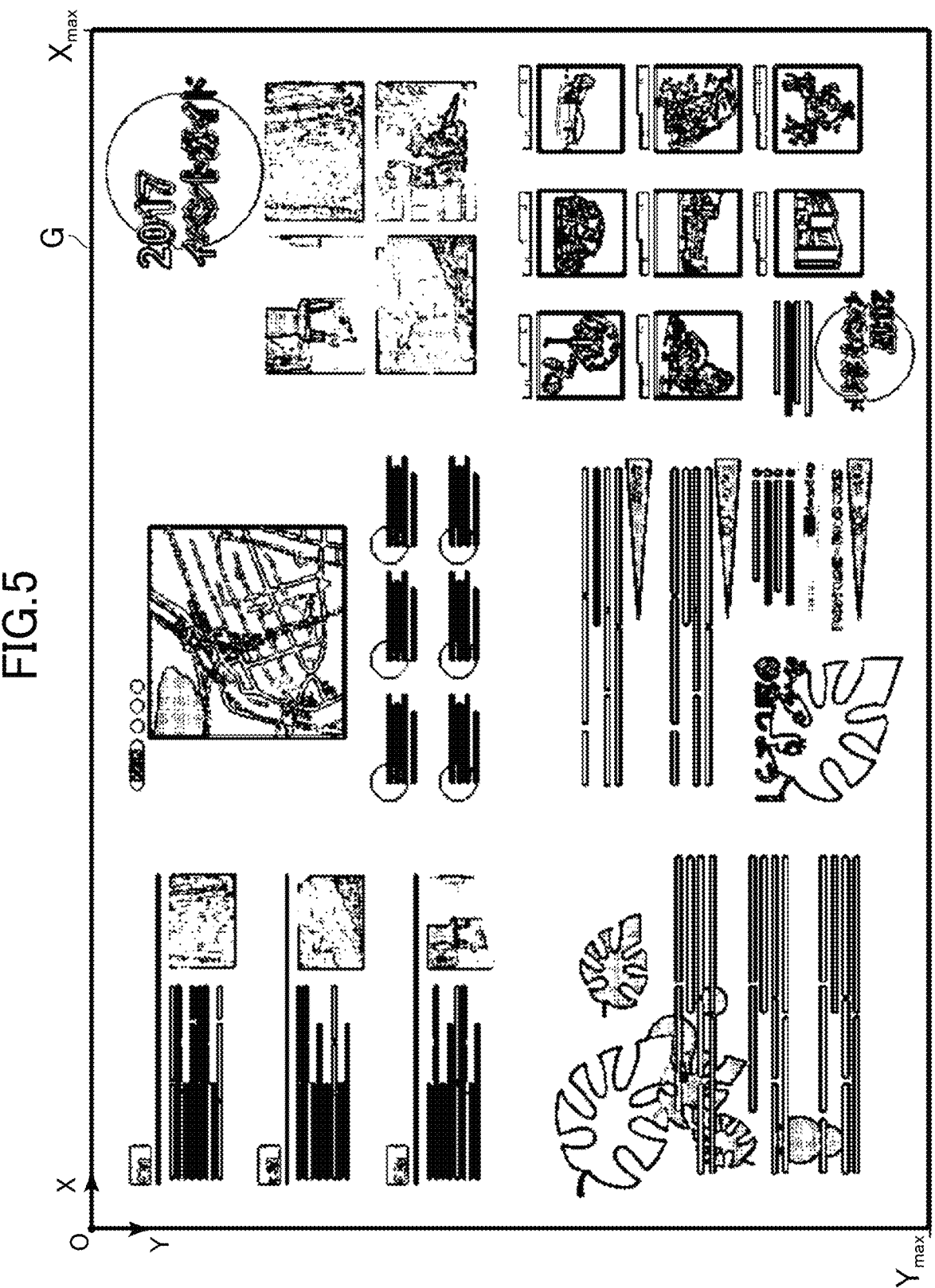
FIG. 5 is a diagram of the image on which edge detection is performed.

FIG. 5 is a diagram of the image G on which edge detection is performed. In FIG. 5, edge pixels are indicated in black, and non-edge pixels are indicated in white. The edge pixel and the non-edge pixel may be indicated, in any color. For example, the edge pixel maybe indicated in white, and the non-edge pixel may be indicated in black. As shown in FIG. 5, for example, the outlines of the objects in the image G have sharp color change around them, and thus are detected as edge pixels. On the other hand, the background of the image G has little color change, and thus is detected as non-edge pixels.

The method of detecting objects is not limited to the method using edge detection. For example, the detecting unit 102 may detect an object in the image G based on an object recognition method, and classify object pixels and background pixels. The object recognition method may use, for example, optical character recognition, bag of visual words (BoVW) method of identifying an object from local feature amount in an image, and pattern matching method of identifying an object by comparing the object with learning data storing basic forms of objects. In this case, the detecting unit 102 classifies pixels forming the object detected in the image G into the object pixels, and pixels other than the object pixels into the background pixels.

2-4. Specifying Unit

The specifying unit 103 is implemented mainly by the control unit 11. The specifying unit 103 specifies an area in which the number of pixels of objects on a straight line is less than a threshold value, or an area in which the number of pixels of a background on the straight line is equal to or more than the threshold value based on the positions of the objects (coordinates of the object pixels) detected in the image. That is, the specifying unit 103 specifies an area in which the number of object, pixels on a straight line is less than a threshold value, or an area in which the number of background pixels on the straight line is equal to or more than the threshold value.

In this embodiment, based on positions of outlines of objects (coordinates of edge pixels) detected by the edge detection for the image G, the specifying unit 103 specifies an area in which the number of pixels of the outlines on a straight line is less than a threshold value, or an area in which the number of pixels that are not the outline on a straight line is equal to or more than the threshold value. That is, the specifying unit 103 specifies an area in which the number of edge pixels on a straight line is less than the threshold value, or an area in which the number of non-edge pixels on a straight line is equal to or more than the threshold value.

The straight line may be any straight line on the image G, and may have any length and direction. For example, the straight line may be a line shorter than a longitudinal width or a lateral width of the image G, or may not be a line connecting the edges of the image G. In this embodiment, a straight line connecting one edge of the image G with another edge of the image G will be taken as an example. As such, the specifying unit 103 specifies an area in which the number of pixels of the objects on the straight line connecting one edge of the image G with another edge of the image G is less than the threshold value, or an area in which the number of pixels of the background on the straight line connecting one edge of the image G with another edge of the image G is equal to or more than the threshold value.

Here, one edge is one of upper, lower, left, and right edges, and another edge is an edge adjacent to or opposing to the one edge. The opposing edge is, for example, the right edge if the one edge is the left edge, and the lower edge if the one edge is the upper edge. For example, the straight line connecting one edge and another edge of the image G may be diagonal, although in this embodiment, a case will be described in which the straight line is one of a straight line in the longitudinal direction of the image G and a straight line in the lateral direction of the image G. The straight line in the longitudinal direction is a straight line in the Y-axis direction, and the straight line in the lateral direction is a straight line in the X-axis direction.

The area specified by the specifying unit 103 is a candidate for a position to divide the image G, or a candidate for a boundary of a page P. In this embodiment, the pages P are divided at the folds of the leaflet, and thus the area specified by the specifying unit 103 is a fold of the leaflet. As such, in this embodiment, the area specified by the specifying unit 103 is referred to as a fold area.

The threshold value to specify a fold area may be a fixed value, or a variable value. In a case of a variable value, the threshold value may be changed by a user, or automatically changed according to the image G. In a case where the threshold value is changed according to the image G, the data storage unit 100 may store relationship between features of the image G and threshold value, and the threshold value associated with the features of the image G may foe determined. This relationship may be data in a numerical formula or a table, format, or described in a portion of program code.

The features of the image G is features of a shape or a color of the image G, and include, for example, a size (the number of total pixels) of the image G, a width (the number of pixels in longitudinal and lateral directions) of the image G, and the number of colors in the image G (the number of shades that are equal to or more than a predetermined frequency in a histogram). For example, when a size or a width of the image G is greater, the threshold value may be greater so as to appropriately evaluate a ratio of the edge pixels or the non-edge pixels to the total pixels. For example, when the number of colors in the image G is greater, the threshold value may be greater so as to prevent the possibility that a portion that is originally a fold is not detected because of a pale color or a pattern printed on the portion.

For example, the specifying unit 103 specifies at least, one of the rows and columns in which the number of edge pixels in the image G is less than the threshold value. The specifying unit 103 counts edge pixels in each of first to Ymax rows to determine whether the number of edge pixels in each row is less than the threshold value. The specifying unit 103 retains a row in which the number of edge pixels is less than the threshold value as a fold area. Similarly, the specifying unit 103 counts edge pixels in each of first to Xmax columns to determine whether the number of edge pixels in each column is less than the threshold value. The specifying unit 103 keeps a column in which the number of edge pixels is less than the threshold value as a fold area.

Figure 6:
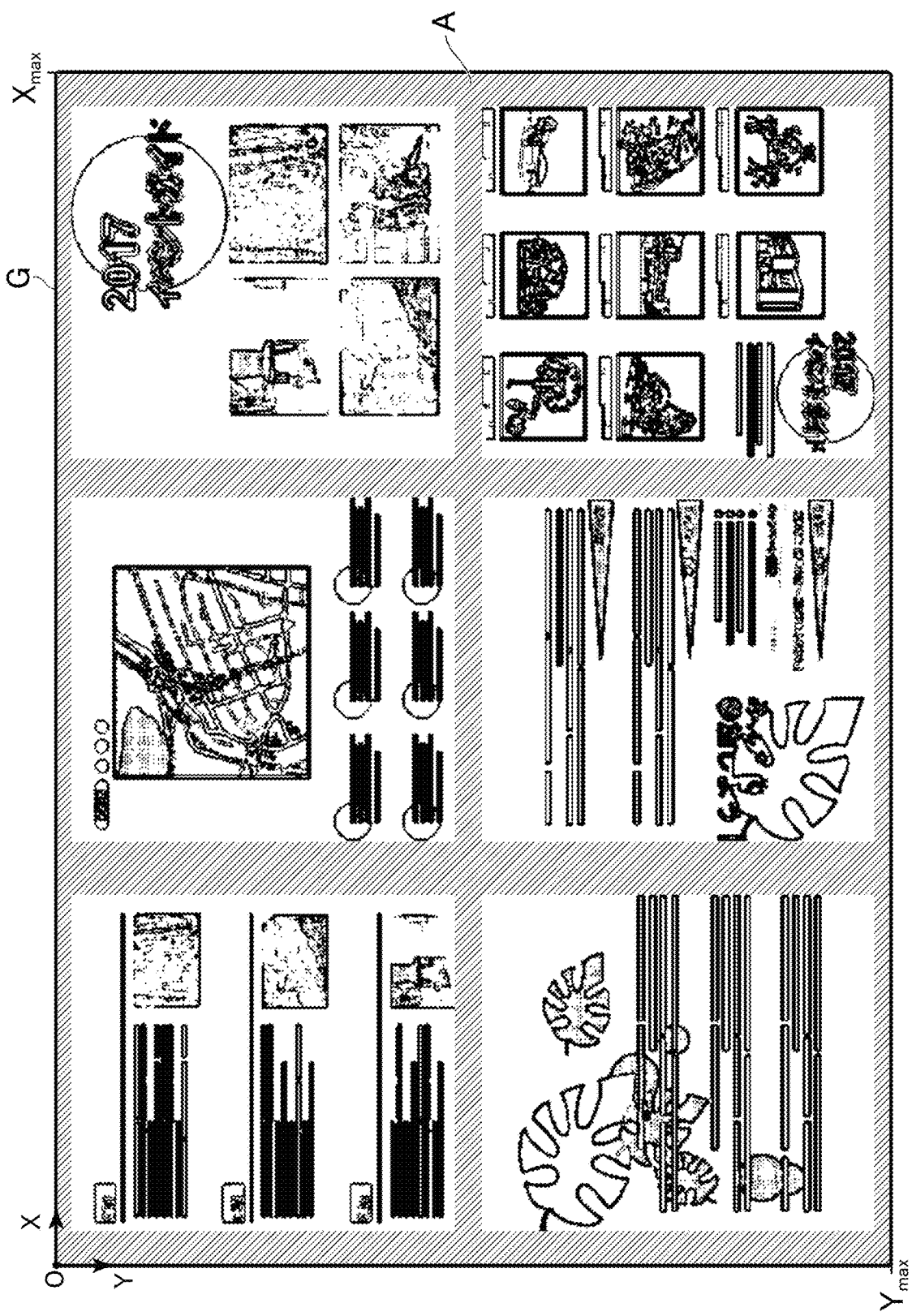
FIG. 6 is a diagram illustrating fold areas specified in the image.

FIG. 6 is a diagram illustrating fold areas specified in the image G. FIG. 6 shows the fold areas A as hatched areas. As shown in FIG. 6, the fold areas A are formed of rows and columns in which no edge pixel exists or fewer edge pixels exist, and include actual folds (actual boundaries of pages) of the leaflet. The specifying unit 103 of this embodiment executes processing for specifying a fold area for each row or each column of the image G, and thus the fold areas A has a grid pattern.

The specifying unit 103 may specify the fold area A by using the number of non-edge pixels instead of using the number of edge pixels. In this case, the specifying unit 103 specifies at least one of rows and columns in which the number of non-edge pixels in the image G is equal to or more than the threshold value. For example, the specifying unit 103 counts non-edge pixels in each of first to Ymax rows, and determines whether the number of non-edge pixels in each row is equal to or more than the threshold value. The specifying unit 103 retains a row in which the number of non-edge pixels is equal to or more than the threshold value as a fold area A. Similarly, the specifying unit 103 counts non-edge pixels in each of first to Xmax columns to determine whether the number of non-edge pixels in each column is equal to or more than the threshold value. The specifying unit 103 keeps a column in which the number of non-edge pixels is equal to or more than the threshold value as a fold area A.

2-5. Processing Executing Unit

The processing executing unit 104 is implemented mainly by the control unit 11. The processing executing unit 104 executes processing for dividing the image G into pages based on the fold areas A specified by the specifying unit 103. In this embodiment, since the fold areas A include folds of the leaflet (i.e., folds are positioned in the fold areas A), the processing executing unit 104 executes the processing for dividing the image G into multiple pages at positions of the folds in the fold areas A specified by the specifying unit 103.

Here, as an example of processing executed by the processing executing unit 104, image processing will be described in which the processing executing unit 104 determines positions to divide the image G based on the fold areas A specified by the specifying unit 103, and displays the determined dividing positions on the display unit 15 that displays the image G.

In a case where the image G is divided into small images, the dividing positions are outlines of the small images, and also indicate cutout positions. The dividing positions are specified by lines in the image G, and, for example, specified by straight lines connecting the edges of the image G. The processing executing unit 104 may set all of the fold areas A to the dividing positions, or set straight lines in the fold areas A to the dividing positions. In this embodiment, the processing executing unit 104 executes the processing based on the straight lines in the fold areas A specified by the specifying unit 103.

The image processing executed by the processing executing unit 104 may be any processing capable of visually identifying a fold area A, such as, changing a display manner of the fold area A in the image G and displaying another image so as to indicate the fold area A. Changing the display manner means changing an appearance of the image, such as, changing a color or brightness (luminance) of the image, and adding a pattern to the image.

Figure 7:
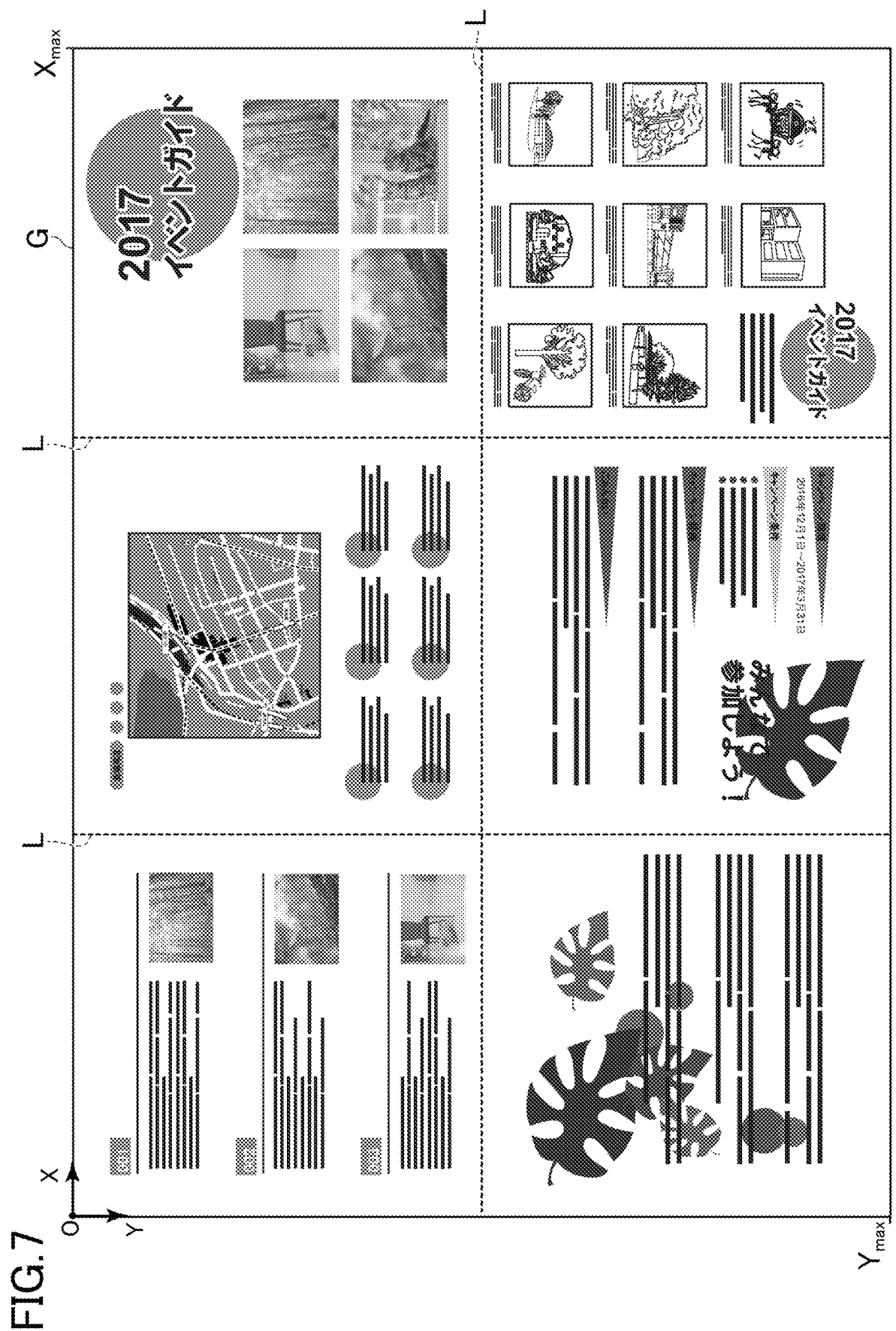
FIG. 7 is a diagram showing an example of processing of a processing executing unit.

FIG. 7 is a diagram showing an example of the processing of the processing executing unit 104. As shown in FIG. 7, for example, the processing executing unit 104 displays straight lines L in the image G so as to indicate the fold areas A. In addition to the dotted lines shown in FIG. 7, various types of lines, such as a solid line and a dashed line, can be applied to the straight line L. The straight line L may have any color, such as a fluorescent color so as to be recognizable.

The processing executing unit 104 may draw the straight lines L in all of the fold areas A obtained by the specifying unit 103, or only in some of the fold areas A. For example, in the fold area A having two or more pixels in width, the processing executing unit 104 selects a width of only one pixel of the fold area A to draw a straight line L. The thickness of the straight line L is not limited to one pixel, but may be freely determined.

In the example shown in FIG. 7, the processing executing unit 104 does not draw straight lines L in all of the fold areas A, but selects some of the rows or the columns to draw the straight lines L. For example, the processing executing unit 104 may select the center line of the fold areas A, the edge lines of the fold area As, or the lines therebetween. The areas around the edges of the image G are also detected as the fold areas A, but the straight line L is not drawn in such areas because it is known in advance that the edges of the leaflet have no fold. In this embodiment, the straight line L determined by the processing executing unit 104 is changed according to an operation received by the receiving unit 106, and thus the processing executing unit 104 determines and displays initial positions of the dividing positions (i.e., candidates of the dividing positions).

2-6. Display Control Unit

The display control unit 105 is implemented mainly by the control unit 11. The display control unit 105 displays the image G on the display unit 15. In this embodiment, a user indicates the dividing positions in the image G. For example, when the image editing software for editing the image G is activated, the display control unit 105 displays the image G on a screen of the image editing software. The image editing software may be any software capable of editing an image, including dividing and cutting an image.

2-7. Receiving Unit

The receiving unit 106 is implemented mainly by the control unit 11. The receiving unit 106 receives an operation to change a dividing position. The operation may be any operation that can be performed by the operation unit 14, such as an operation to move a straight line L up and down and left and right, and an operation to change a direction of a straight line L. The processing for changing a straight line L based on an operation received by the receiving unit 106 may be executed by the processing executing unit 104 or the dividing unit 107.

A user may specify a new dividing position on the image editing software. In this case, the receiving unit 106 receives a position specified by the user on the screen using the operation unit 14 as a dividing position. For example, the user specifies a line or an area on the image G displayed on the image editing software, thereby specifying a dividing position.

2-8. Dividing Unit

The dividing unit 107 is implemented mainly by the control unit 11. The dividing unit 107 divides the image G based on the dividing position changed according to the operation received by the receiving unit 106. For example, the dividing unit 107 divides the image G at the dividing position changed by the user, and stores each page in the data storage unit 100 as a separate image.

3. Processing Executed in the Embodiment

Figure 8:
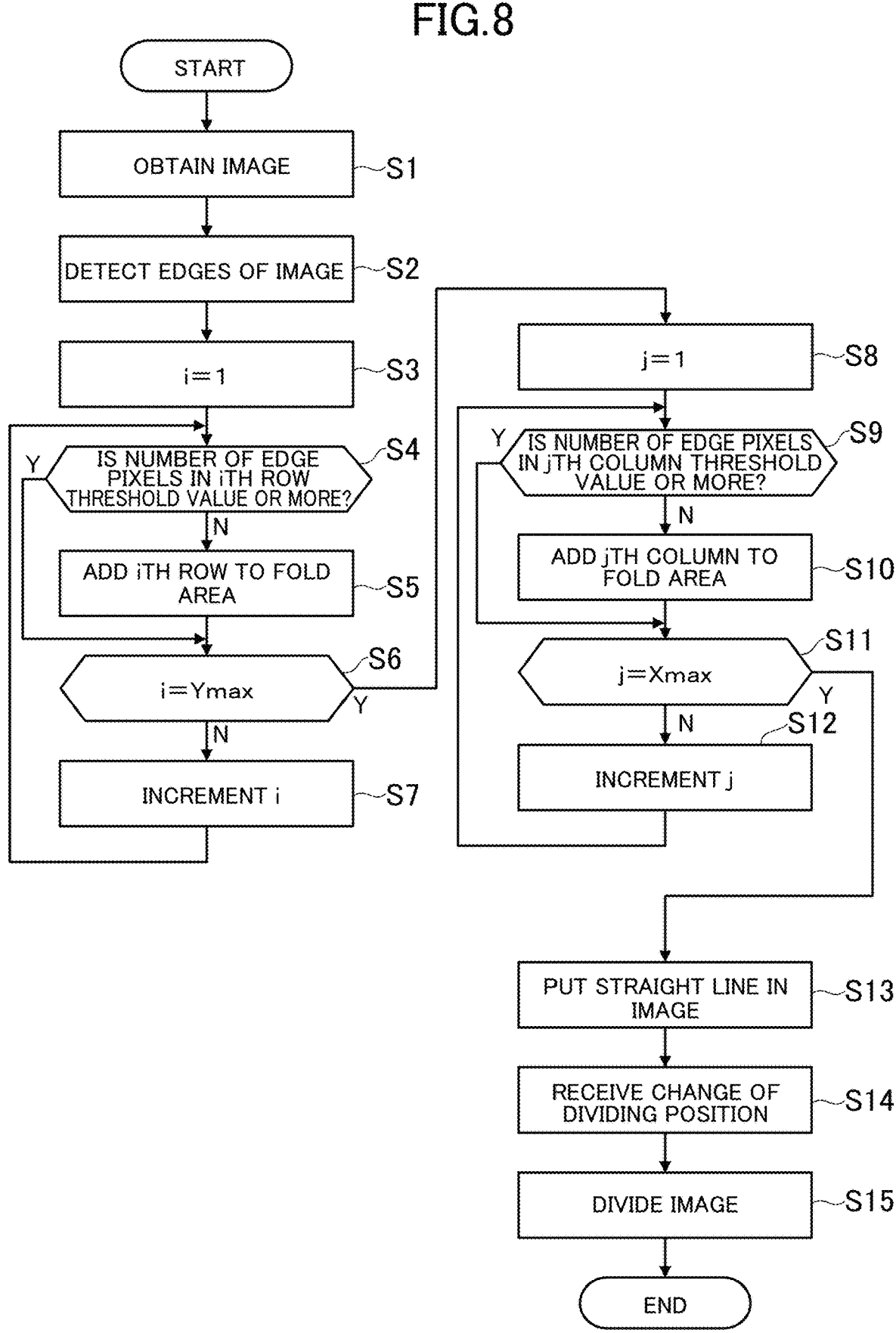
FIG. 8 is a flow chart showing an example of processing executed in the image processing device.

FIG. 3 is a flow chart showing an example of processing executed in the image processing device 10. The processing shown in FIG. 8 is executed when the control unit 11 operates according to a program stored in the storage unit 12. The processing described below is an example of the processing executed by the functional block shown in FIG. 2.

As shown in FIG. 8, the control unit 11 obtains the image G stored in the storage unit 12 (S1). In S1, for example, the control unit 11 activates image editing software based on an operation of a user, and reads the image G to be edited from the storage unit 12.

The control unit 11 detects edges bf the image G (S2). In S2, the edges are detected in the image G based on a predetermined edge detection algorithm. The storage unit 12 stores information for identifying each pixel as an edge pixel or a non-edge pixel (e.g., image G in FIG. 5).

The control unit 11 substitutes 1 for a counter variable i (S3). The counter variable i is information stored in the storage unit 12 and identifying which row is to be a target of processing. The control unit 11 determines whether the number of edge pixels in the ith row of the image G is equal to or more than a threshold value (S4). In S4, the control unit 11 determines whether each pixel is an edge pixel in a sequential order from the first column to the Xmax column in the ith row, thereby counting edge pixels. In this regard, the threshold value used in S4 is stored in the storage unit 12 in advance.

If it is determined that the number of edge pixels in the ith row is less than the threshold value (S4; N), it is highly likely the ith row is a fold, and thus the control unit 11 adds the ith row to the fold areas A (S5). In S5, the control unit 11 stores, in the storage unit 12, information for identifying the ith row as the fold area A (e.g., the hatched area in the image G of FIG. 6). On the other hand, if it is determined that the number of edge pixels in the ith row is equal to or more than the threshold value (S4; Y), it is less likely that the ith row is a fold, and thus the processing in S5 is not executed.

The control unit 11 determines whether the counter variable i is a maximum value Ymax (S6). In S6, the control unit 11 determines whether the determination processing in S4 is executed for all of the first to Ymax rows. If it is not determined that the counter variable i is the maximum value Ymax (S6; N), the control unit 11 increments the counter variable i (S7), and the processing returns to S4. In this case, it is determined whether the next row is a fold area A.

If it is determined that the counter variable i is the maximum value Ymax (S6; Y), since the determination in the row direction is finished already, the control unit 11 substitutes 1 for a counter variable j so as to perform determination in the column direction (S8). The counter variable j is information stored in the storage unit 12 and identifying the number of columns to be a target of processing. Here, a case will be described in which the determination in the row direction is performed and then the determination in the column direction is performed, although the determination in the row direction may be performed after the column direction. As another example, the determination in the column direction and the determination in row direction may be performed alternatively.

The control unit 11 determines whether the number of edge pixels in the jth column of the image G is equal to or more than a threshold value (S9). In S9, the control unit 11 determines whether each pixel is an edge pixel in a sequential order from the first row to the Ymax row in the jth column, thereby counting edge pixels. In this regard, the threshold value used in S9 is stored in the storage unit 12 in advance. Further, the threshold value in S9 and the threshold value in S4 may be the same or different. If the threshold values are different to each other, a threshold value for a ratio according to an aspect ratio of the image G may be used.

If it is determined that the number of edge pixels in the jth column is less than the threshold value (S9; N), it is highly likely the jth column is a fold, and thus the control unit 11 adds the jth column to the fold areas A (S10). In S10, the control unit 11 stores, in the storage unit 12, information for identifying the jth column as the fold area A (e.g., the hatched area of the image G in FIG. 6). On the other hand, if it is determined that the number of edge pixels in the jth column is equal to or more than the threshold value (S9; Y), it is less likely that the jth column is a fold, and thus the processing in S10 is not executed.

The control unit 11 determines whether the counter variable j is a maximum value Xmax (S11). In S11, the control unit 11 determines whether the determination processing in S9 is executed for all of the first to Xmax columns. If it is not determined that the counter variable j is the maximum value Xmax (S11; N), the control unit 11 increments the counter variable j (S12), and the processing returns to S9. In this case, it is determined whether the next column is a fold area A.

If it is determined that the counter variable j is the maximum value Xmax (S11; Y), since the determination processing is executed for all of the rows and columns in the image G, the control unit 11 puts straight lines L in the image G based on the fold areas A, and displays the image G on the display unit. (S13). In S13, the control unit 11 puts a straight line L in the center of a fold area A having a predetermined width or more. The control unit 11 does not put a straight line L in a fold area A in contact with an edge of the image G.

The control unit 11 receives a change of the dividing position based on a detection signal from the operation unit 14 (S14) and divides the image G (S15), then the processing is terminated. In S14, the control unit 11 moves or changes the directions of the straight lines L determined in S13 in response to the user's operation. In S15, when a predetermined operation to divide the image G is performed, the control unit 11 divides the image G based on the current straight lines L, and stores each of the divided images in the storage unit 12 in association with the image G. This makes it possible to display each of the pages P as a separate page on an electronic brochure, for example. The user may specify page numbers. In this case, the page numbers specified by the user are stored in the storage unit 12 in association with the images of the respective pages P.

The image processing device 10 as described above obtains a fold area A in the image G based on the number of edge pixels or non-edge pixels on the straight lines, and executes the processing for dividing the image G into pages, thereby saving labor in dividing the image G into multiple pages. For example, in a case where a user manually specifies a dividing position, it is possible to assist the user by displaying a straight line L, which is a candidate for a dividing position. For example, in a case where the image processing device 10 automatically divides the image G at a fold area A, it is possible to automate the processing for dividing the image G into pages.

The image processing device 10 can simplify the processing for obtaining a fold area A with the use of edge detection for which various algorithms are available, thereby reducing the processing load on the image processing device 10 and speeding up the processing for obtaining a fold area A.

The image processing device 10 can increase the accuracy of extraction of a fold area A by defining a straight line connecting one edge of the image G with another edge as the fold area A. For example, an actual fold of the leaflet is a straight line connecting edges of the paper, and thus a fold area A close to the actual fold can be extracted.

The image processing device 10 can further increase the accuracy of extraction of a fold area A by defining a straight line in the longitudinal direction or the lateral direction of the image G as the fold area A. For example, an actual fold of the leaflet is often in the longitudinal direction or the lateral direction of the paper, and thus a fold area A close to the actual fold can be extracted.

On the screen where the user specifies the dividing position, the image processing device 10 displays the fold area A in a distinguishable way, and changes the dividing position based on the user's operation, thereby assisting the user to divide the image G into pages. This makes it possible to save labor in dividing the image G into multiple pages.

When a fold area A is thick and it is thus hard to identify a real fold, the image, processing device 10 uses the straight line L in the fold area A so as to readily identify the fold and effectively assist the user.

The image processing device 10 can save labor in dividing the image of the leaflet, which is described as an example of the image G, into pages P. For example, when the image processing device 10 processes images of a leaflet uploaded by a hotel or a tourist association so as to form an electronic brochure, the image processing device 10 needs to process a lot of images. In this case as well, data required for the electronic brochure can be promptly generated. As such, for example, when an electronic brochure is generated from a leaflet, many electronic brochures can be generated in a short time.

4. Variations

The present invention is not to be limited to the above described embodiment. The present invention can be changed as appropriate without departing from the spirit of the invention.

Figure 9:
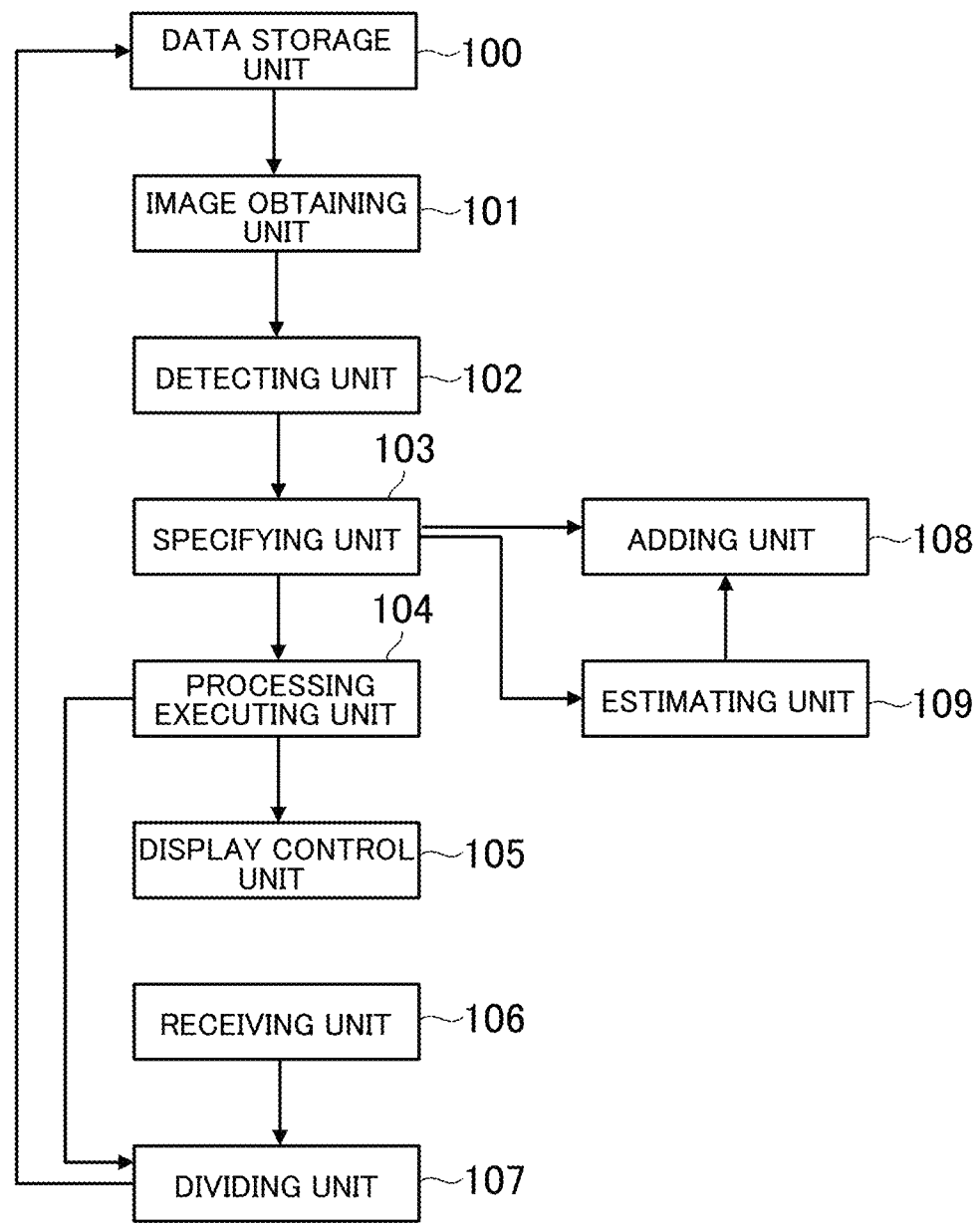
FIG. 9 is a functional block diagram according to a variation.

FIG. 9 is a functional block diagram according to a variation. As shown in FIG. 9, in the variation described below, an adding unit 108 and an estimating unit 109 are implemented in addition to the functions described in the embodiment. These functions are implemented mainly by the control unit 11.

(1) For example, the processing executed by the processing executing unit 104 is not limited to the image processing of making a fold area A distinguishable as described in the embodiment. The processing executing unit 104 may execute image processing for dividing the image G into a plurality of pages based on the fold area A. That is, the image G may be automatically divided by the processing executing unit 104 instead of being manually divided by a user.

The processing executing unit 104 may divide the image G by using all of fold areas A, or some of the fold areas A. For example, the processing executing unit 104 may divide the image G into six portions at the straight lines L shown in FIG. 7. In this case, the processing executing unit 104 also serves the function of the dividing unit 107 described in the embodiment.

According to variation (1), the image processing device 10 divides the image G based on the fold areas A, thereby automatically divide the image G into a plurality of pages. This serves to save labor in dividing the image G into a plurality of pages.

(2) For example, in the embodiment, the case has been described in which a straight line L is drawn at the center of a fold area A, although the straight line L may be drawn at any position in the fold area A. For example, characters or photographs may be printed in the vicinity of a fold in some pages. In this case, if a straight line L is drawn at an edge of a fold area A, the straight line L is closer to the fold.

For example, the processing executing unit 104 executes the processing based on a straight line L at an edge of a fold area A specified by the specifying unit 103. The processing executing unit 104 may determine the edge of the fold area A as the straight line L regardless of a width of the fold area A. Alternatively, the processing executing unit 104 may execute the processing based on the straight line L in the edge of the fold area A when the fold area A has a predetermined width or more. The predetermined width may be any width, such as a width of 100 pixels including a certain amount of margin. The straight line L on the edge is a straight line in the right edge or the left edge of the fold area A if the fold area A is vertically long, and is a straight line in the upper edge or the lower edge if the fold area A is horizontally long. Vertically long means that the longitudinal width is longer than the lateral width, and horizontally long means that the lateral width is longer than the longitudinal width.

According to variation (2), a straight line L can be drawn at a position close to an actual fold, which serves, to increase accuracy of estimation of a fold position. For example, using the result of the edge detection can solve a problem that an image is divided at an undesirable position.

(3) For example, if a distance between straight lines L is too short, it is highly likely that a page does not exist between the straight lines L and a position that is not originally a fold is happened to be detected as a fold. Further, for example, if a distance between a straight line L and an edge of the image G is too short, it is also highly likely that a position that is not originally a fold is happened to be detected as a fold. As such, if a distance between straight lines L or a distance between a straight line L and an edge of the image G is so short that an area enclosed by the straight lines L is hard to be assumed as a page, the straight lines L may be removed.

For example, the processing executing unit 104 selects. straight lines L in the fold areas A specified by the specifying unit 103 and executes the processing based on the selected straight lines L so that a distance between the straight lines L or a distance between the straight line L and an edge of the image G is equal to or more than a predetermined distance. The predetermined distance is any distance determined in advance, such as 100 pixels, in view of a page width of a general leaflet.

For example, if a distance between straight lines L is less than the predetermined distance, the processing executing unit 104 may remove the straight line L on the left side or the upper side, or remove the straight line L on the right side or the lower side. For example, if a distance between a straight line L and an edge of the image G is less than the predetermined distance, the processing executing unit 104 may remove the straight line L. The processing executing unit 104 repeatedly removes straight lines L until a distance between the straight lines L or a distance between the straight line L and the edge of the image G is equal to or more than the predetermined distance. That is, the processing executing unit 104 gradually reduces the straight lines L until the distance between the straight lines L or the distance between the straight line L and the edge of the image G is equal to or more than the predetermined distance.

According to variation (3), a distance between straight lines 1 can be extended to the extent that a page is assumed to exist between the straight lines 1, and thus accuracy of estimation of a fold position can be increased. For example, using the result of the edge detection can solve a problem that the image is divided in an undesirable way (too much finely).

(4) For example, after dividing the image G of the leaflet into pages, a user sometimes rearranges the divided images in page order. In this regard, the page order and the page width may be related to each other, and thus the page order may be assumed based on distances between the fold areas A so as to assist the user to rearrange the images in the page order.

In this variation, the image processing device 10 includes the adding unit 108. The adding unit 108 adds page numbers to the image parts divided by the fold areas A based on the distances between the fold areas A specified by the specifying unit 103 or the distances between the fold areas A and the edges of the image G. The image part is an area to be a candidate of a page, and a distance between fold areas A or a distance between a fold area A and an edge of the image G is, for example, a width (a longitudinal width or a lateral width) of an area to be a candidate of a page.

Figure 10:
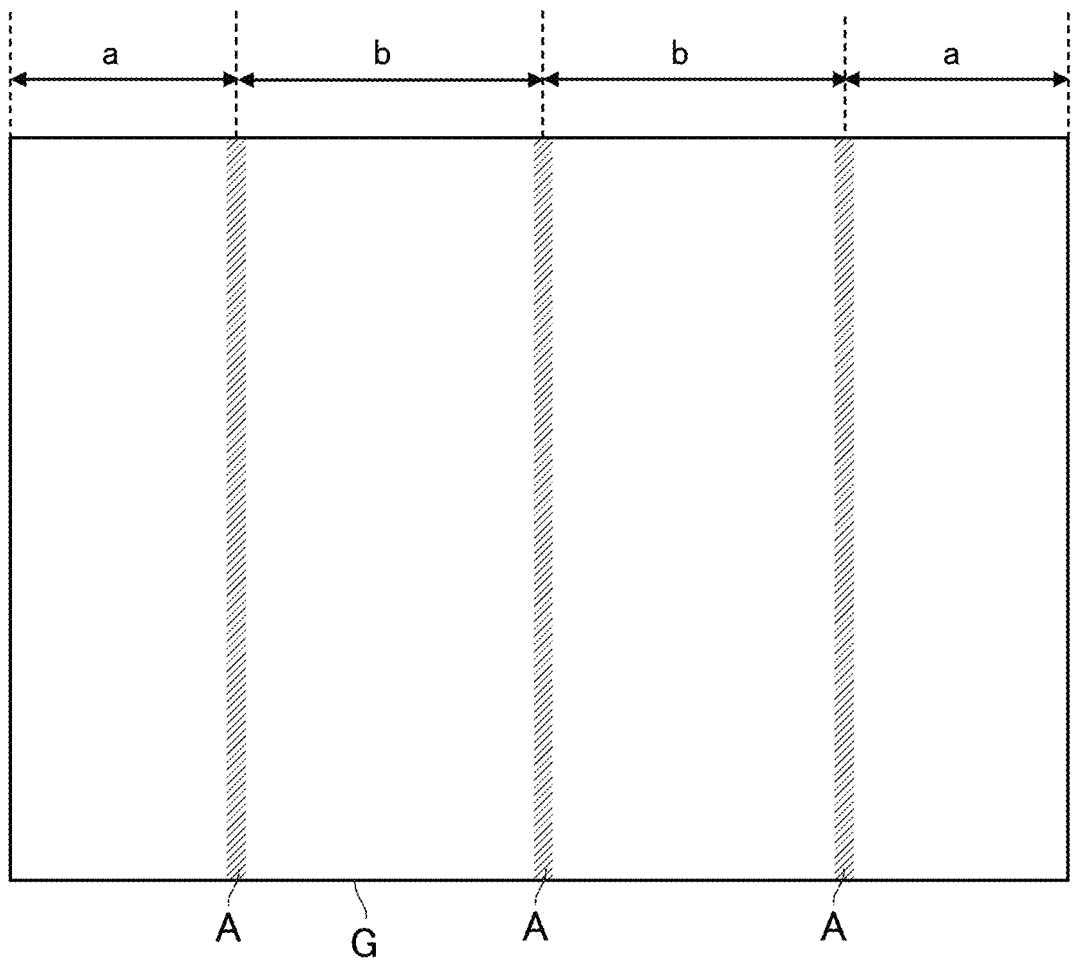
FIG. 10 is a diagram illustrating distances between fold areas.

FIG. 10 is a diagram illustrating distances between fold areas A. In FIG. 10, objects and a background in the image G are omitted. In the example of FIG. 10, the image G is divided into four image parts by three fold areas A. The adding unit 108 calculates widths of the respective image parts based on the distances between the fold areas A. Here, the widths are lateral widths a, b, b, and a, from the left, and the lateral width a is shorter than the lateral width b.

The adding unit 108 adds page numbers to the image parts based on the calculated widths. The data storage unit 100 previously stores relationship between conditions regarding the widths and addition rule of the page numbers. The relationship may be data in a numerical formula or a table format, or described in a portion of program code. The adding unit 108 adds page numbers based on the addition rules associated with the conditions satisfied by the calculated widths.

The conditions of the widths include directions (longitudinal direction or lateral direction), lengths, and the number of the detected widths, and indicate how many widths and in what direction and in what length are detected. The addition rules are to define relationship between positions (coordinates information) in the image G and page numbers. For example, the adding unit 108 refers to the addition rule associated with the condition satisfied by the calculated width, and adds a page number associated with an image part divided by the fold areas A to the image part.

Figure 11:
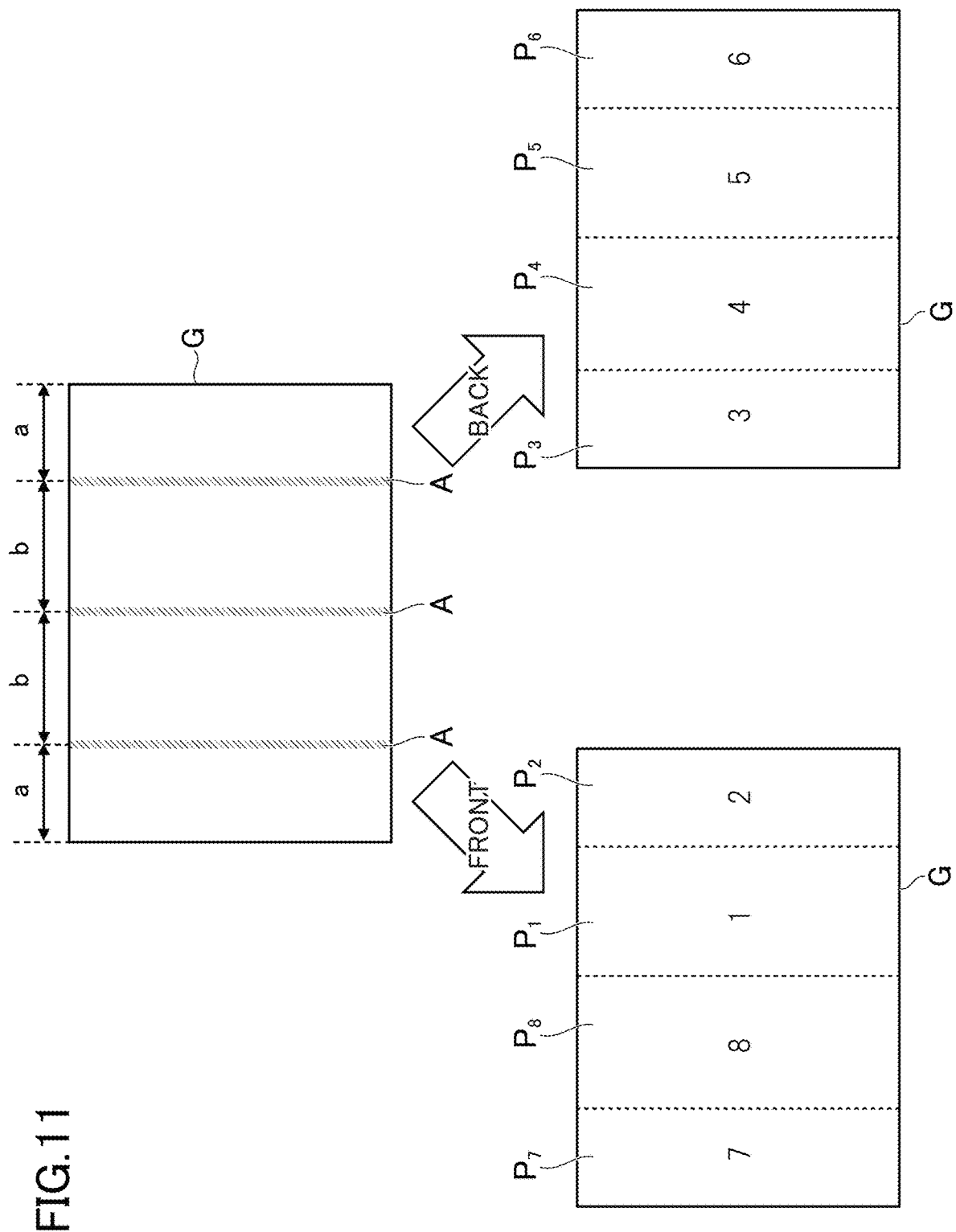
FIG. 11 is a diagram illustrating an example of relationship between widths of image parts and page numbers.
Figure 12:
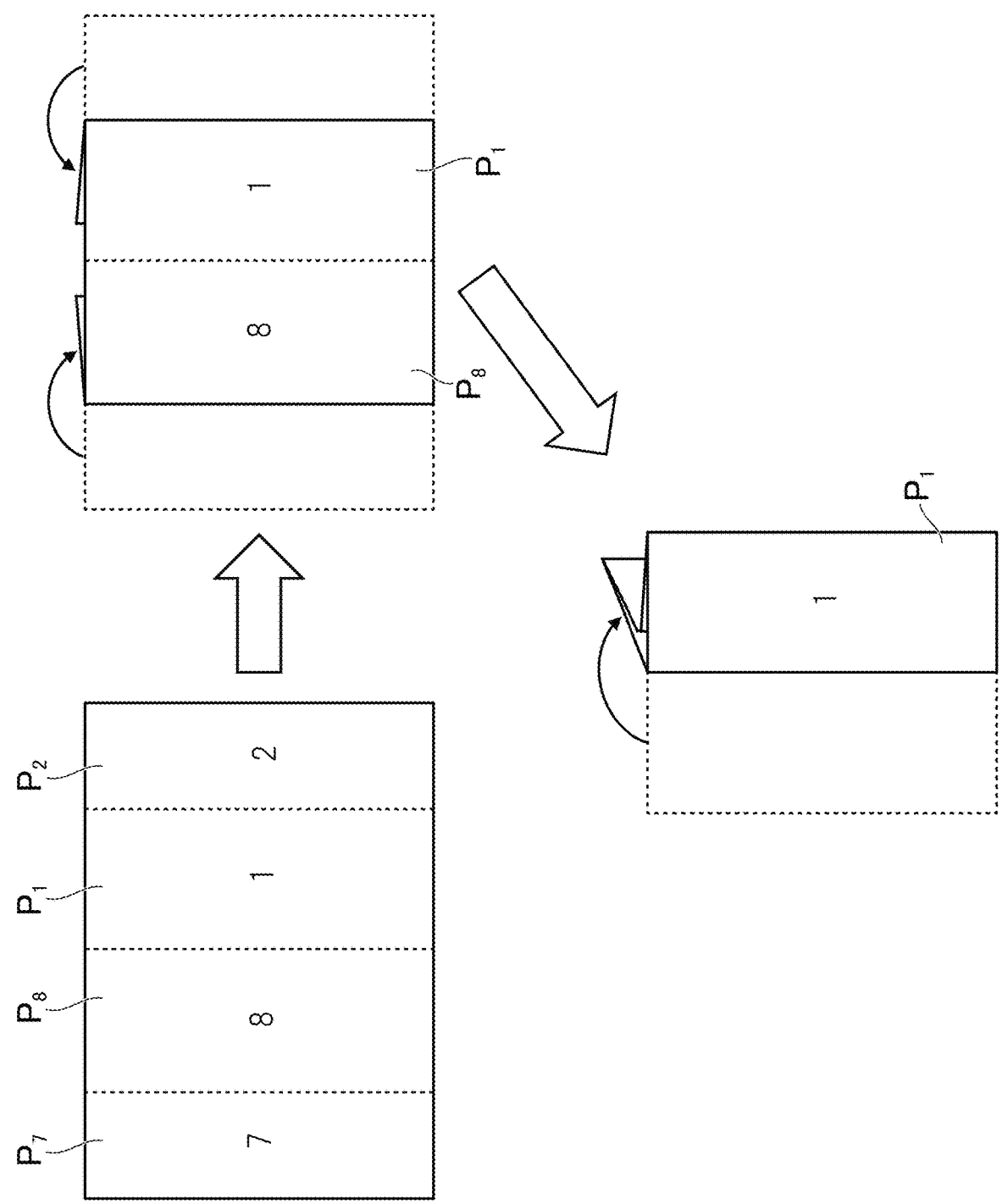
FIG. 12 is a diagram of an example of a way to fold the leaflet shown in FIG. 11.

FIG. 11 is a diagram illustrating an example of relationship between widths of image parts and page numbers, and FIG. 12 is a diagram of an example of a way to fold the leaflet shown in FIG. 11. As shown in FIG. 11, here, a case will be described in which the image G is a duplex printed leaflet. For example, the lateral widths a, b, b, and a are disposed in this order from the left. When a>b, as shown in FIG. 11, the seventh page $P_7$, the eighth page $P_8$, the first page $P_1$, and the second page $P_2$ may be disposed in this order from the left on the front side, and the third page $P_3$, the fourth page $P_4$, the fifth page $P_5$, and the sixth page $P_6$ may be disposed in this order from the left on the back side.

In this case, as shown in FIG. 12, the leaflet may be folded in what we call a gatefold. For example, the leaflet is folded between the first page $P_1$ and the second page $P_2$ to make a mountain fold, and folded between the seventh page $P_7$ and the eighth page $P_8$ to make a mountain fold. Then, the leaflet is folded between the first page $P_1$ and the eighth page $P_8$ to make a mountain fold. In this way, pages in the short lateral width b (e.g., the second page $P_2$ and the seventh page $P_7$) are folded into the inside of the leaflet, and thus it is possible to prevent these pages from being torn or folded in a wrong direction. The adding unit 108 may add a page number on the front side or the back side to each image part of the image G.

Figure 13:
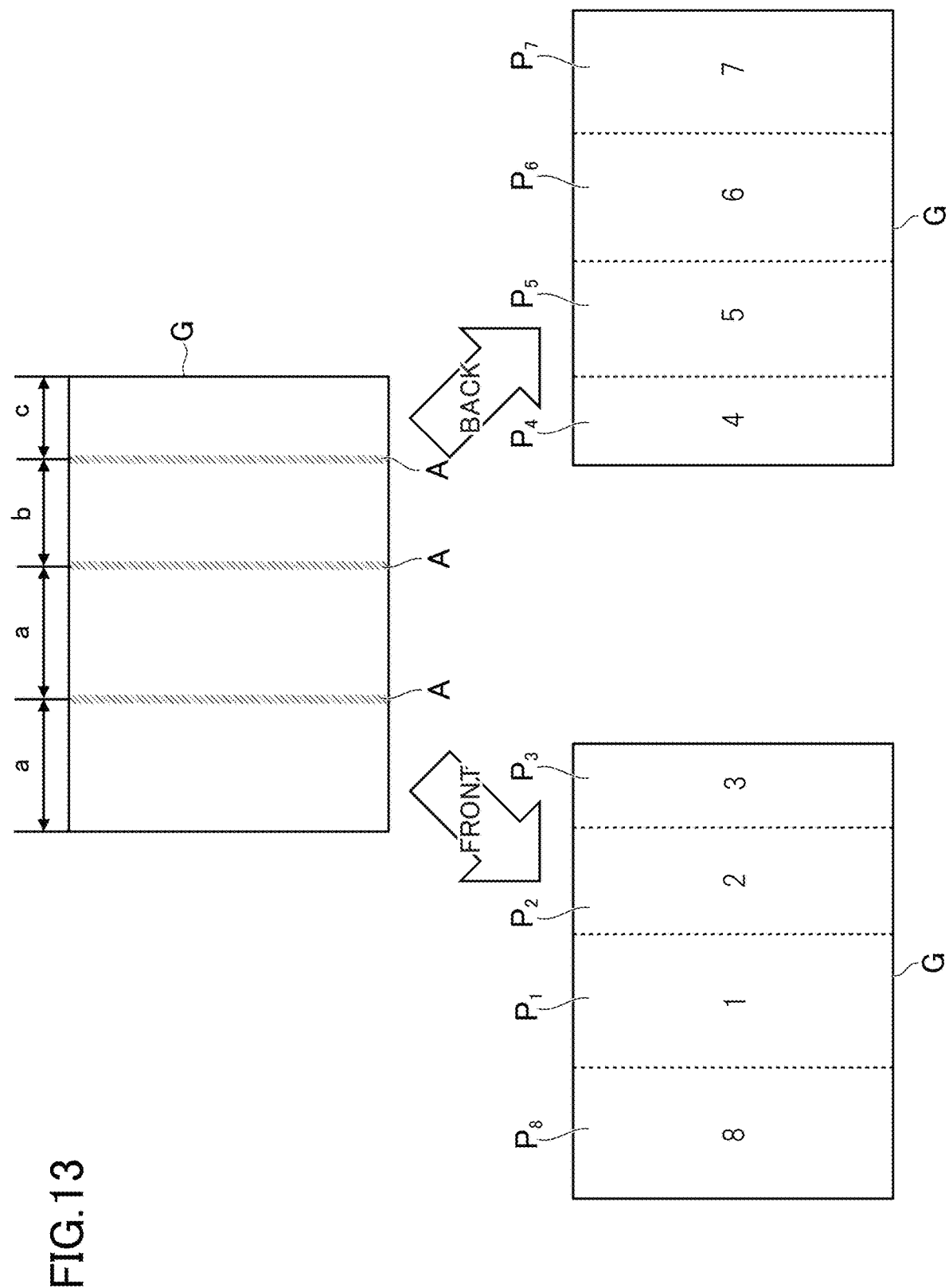
FIG. 13 is a diagram illustrating an example of relationship between a page width and a page number.
Figure 14:
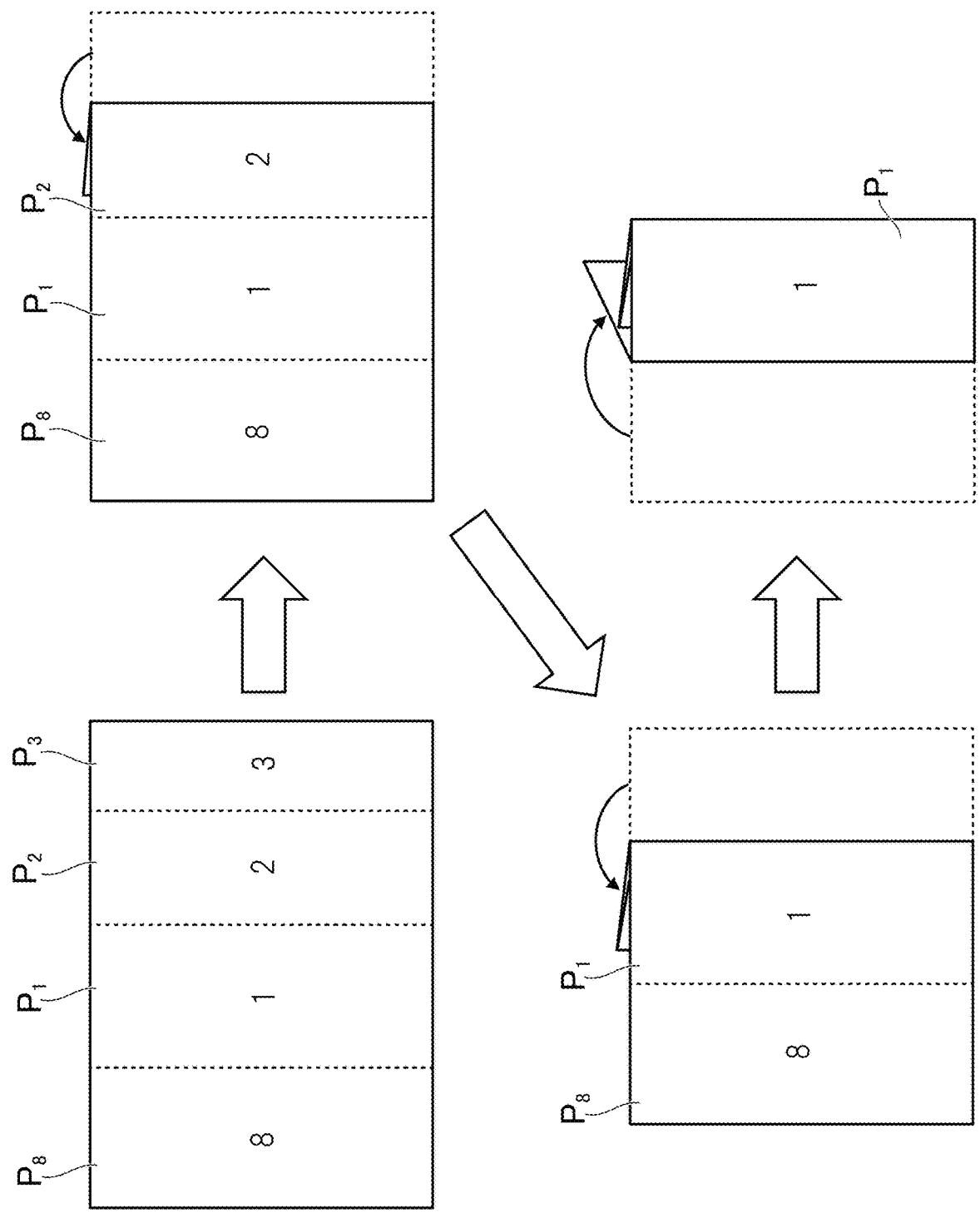
FIG. 14 is a diagram of an example of a way to fold the leaflet shown in FIG. 13.

FIG. 13 is a diagram illustrating an example of the relationship between a page width and a page number, and FIG. 14 is a diagram of an example of a way to fold the leaflet shown in FIG. 13. Here, a case will be described in which the image G is also a duplex printed leaflet. For example, the lateral widths a, a, b, and c are disposed in this order from the left. When a>b>c, as shown in FIG. 13, the eighth page $P_8$, the first page $P_1$, the second page $P_2$, and the third page $P_3$ may be disposed in this order from the left on the front side, and the fourth page $P_4$, the fifth page $P_5$, the sixth page $P_6$, and the seventh page $P_7$ may be disposed in this order from the left in the back side.

In this case, as shown in FIG. 14, the leaf let may be folded in what we call an inside four-folding. For example, the leaflet is folded between the second page $P_2$ and the third page $P_3$ to make a mountain fold, and folded between the first page $P_1$ and the second page $P_2$ to make a mountain fold. Then, the leaflet is folded between the first page $P_1$ and the eighth page $P_8$ to make a mountain fold. In this way, pages in the short lateral widths b and c (e.g., the second page $P_2$ and the third page $P_3$) are folded into the inside of the leaflet, and thus it is possible to prevent these pages from being torn or folded in a wrong direction. The adding unit 108 may add a page number on the front side or the back side to each image part of the image G.

FIGS. 11 to 14 snow only an example of the relationship between the widths and the page numbers. Such relationship may be previously determined based on known layouts of leaflets, and other patterns may be defined in the data storage unit 100. For example, relationship between widths and page numbers in double-folding, inside three-folding, outside three-folding, or outside four-folding may be defined in the data storage unit 100.

The adding unit 108 executes the processing for adding a page number to each of the divided images based on the added page numbers. The processing may be image processing for displaying, on the image editing software, each image part in association with a page number, or processing for automatically adding page numbers to the images divided by the dividing unit 107.

According to variation (4), it is possible to save labor in adding page numbers. For example, in a case where pages F of a leaflet are divided and displayed as an electronic brochure, it is possible to save labor in specifying the display order of the pages P.

(5) For example, the number of image parts divided by fold areas A on the image G relates to the number of total pages included in the image G. As such, the number of total pages may be estimated based on the fold areas A to increase the accuracy of estimation of the page numbers.

The image processing device 10 of this variation includes the estimating unit 109. The estimating unit 109 estimates the number of total pages of image parts based on fold areas A specified by the specifying unit 103. The estimating unit 109 specifies the image parts in the image G divided by the fold areas A. The estimating unit 109 counts the number of the image parts divided by the fold areas A, thereby estimating the number of total pages. For example, in the example of FIG. 10, there are four image parts, and thus the estimating unit 109 estimates the number of total pages to be four or eight. The number of total pages is four in a case of one-side printing, and the number of total pages is eight in a case of duplex printing.

The adding unit 108 of variation (5) adds page numbers to image parts based on the estimation result of the estimating unit 109. The data storage unit 100 previously stores the relationship between the number of total pages and the addition rules of the page numbers. The relationship may be data in a numerical formula or a table format, or described in a portion of program code. The adding unit 108 may add a page number to each page based on the addition rule associated with the number of total pages.

According to variation (5), accuracy of estimation of the page numbers can be increased.

(6) For example, the above variations may be combined.

For example, the processing has been described in which an electronic brochure is generated out of a leaflet, although on the contrary, the image processing device 10 may execute processing for generating a leaflet out of an electronic brochure. At this time, the method same as the method described in the embodiment and the variations may be used. That is, although data of each page is often arranged in the order of page numbers in an electronic brochure, the image processing device 10 may dispose the pages in a single image and then output the data. In this regard, "output" may suggest print, or output image data. For example, in the case where pages are disposed in a single image and then output, the order of the pages and the layout of folds need to be manually specified. In this regard, the image processing device 10 may automatically set the order of the pages and the layout of folds based on the same method as described in the variations (4) to (5).

For example, the image processing device 10 may estimate orientation of each page based on orientation of a character detected by performing the optical character recognition on the image G. The image processing device 10 may present the orientation of the page to a user, or automatically rotate an image in each page based on the estimation result of orientation of each page.

For example, the image processing device 10 may be implemented by a server to which a hotel and a tourist association upload an image G of a leaflet, or implemented by a server other than such a server. For example, in order to automatically execute the processing for dividing the image G, the image processing device 10 may execute the processing every time an image G is uploaded, or execute the processing on a date determined from batches. As another example, a terminal of the hotel and the tourist association that upload the leaflet may correspond to the image processing device 10. In this case, the image processing device 10 also uploads images indicating divided pages P together with the image G. The server may store the uploaded image G and the images of the pages P in a database so as to be displayable as an electronic brochure.

For example, the image processing device 10 may execute processing of images other than a leaflet. For example, the image processing device 10 may execute processing of images indicating a handout or a flier, or images indicating each sheet of brochures. For example, the image processing device 10 may execute processing of images of paper printed in multiple image printing, such as 2-in-1 printing. As another example, the image processing device 10 may execute processing of images of books, such as magazines. For example, when converting a bound book into an electronic book by using a scanner (what we call book scanning), the image processing device 10 may execute processing of the images of the book scanned by the scanner. For example, the image processing device 10 may execute processing of images that are scanned in a state where a plurality of sheets of paper are disposed.

For example, the functions of the image processing device may be omitted except for the image obtaining unit 101, the specifying unit 103, and the processing executing unit 104. For example, the data storage unit 100 may not necessarily be included in the image processing device 10, but may be implemented by a database server. For example, the detecting unit 102 may not necessarily be included in the image processing device 10. Other computers may execute the processing executed by the detecting unit 102, and the data storage unit 100 may previously store the detection results of objects (e.g., image G for which edge processing is performed) by the other computers. In this case, the specifying unit 103 may specify the object detected from the image G (i.e., classification result, of object pixels and background pixels) by referring to the detection results stored in the data storage unit 100.

The invention claimed is:

1. An image processing device comprising, at least one processor configured to:
    obtain an image including, a plurality of objects and a background that is different from the plurality of objects;
    detect a number of pixels in the object or the background for each linear area in the image;
    specify the linear area in which the number of the object is less than a threshold value, or the linear area in which the number of the background is equal to or more than the threshold value; and
    display the specified linear area identifiably on the image, or divide the image into a plurality of images based on the specified linear area.

2. The image processing device according to claim 1, wherein
    the at least one processor specifies, based on a position of an outline of the object detected by edge detection performed on the image, the linear area in which the number of the object is less than a threshold value, or the linear area in which the number of the background is equal to or more than the threshold value.

3. The image processing device according to claim 1, wherein the linear area is an area connecting one edge of the image to another edge of the image.

4. The image processing device according to claim 3, wherein
    the linear area is an area in a longitudinal direction of the image or in a lateral direction of the image.

5. The image processing device according to claim 1, wherein the at least one processor;
    determines a dividing position of the image based on the linear area;
    displays the determined dividing position on a display on which the image is displayed;
    receives an operation to change the dividing position; and
    divides the image based on the dividing position changed by the operation.

6. The image processing device according to claim 1, wherein
    when a plurality of the linear areas are adjacent each other, the at least one processor displays a part of the linear areas identifiably on the image, or divides the image into a plurality of images based on a part of the linear areas.

7. The image processing device according to claim 6, wherein
    the at least one processor displays an edge area of the linear areas identifiably on the image, or divides the image into a plurality of images based on an edge area of the linear areas.

8. The image processing device according to claim 1, wherein
    the at least one processor selects the linear areas so that a distance between the linear areas or a distance between the linear areas and an edge of the image is equal to or more than a predetermined distance, and displays the selected linear areas identifiably on the image, or divide the image into a plurality of images based on the selected linear areas.

9. The image processing device according to claim 1, wherein the at least one processor adds, based on a distance between linear areas or a distance between the linear areas and an edge of the image, page numbers to image parts divided by the linear areas.

10. The image processing device according to claim 9, wherein the at least one processor estimates a number of total pages of the image parts based on the linear areas and adds page numbers to the image parts further based on the number of total pages.

11. The image processing device according to claim wherein
    the image is an image of a leaflet that is opened,
    the object is content of the leaflet,
    the linear area includes a fold of the leaflet, and
    the at least one processor displays the specified linear area as the fold identifiably on the image, or divide the image into a plurality of images as the fold based on the specified linear area.

12. An image processing method comprising:
    obtaining an image including a plurality of objects and a background that is different from the plurality of objects;
    detecting a number of pixels in the object or the background for each linear area in the image;
    specifying, the linear area in which the number of the object is less than a threshold value, or the linear area in which the number of the background is equal to or more than the threshold value; and
    display the specified linear area identifiably on the image, or divide the image into a plurality of images based on the specified linear area.

13. A non-transitory computer readable information storage medium storing a program for causing a computer to:
    obtain an image including a plurality of objects and a background that is different from the plurality of objects;
    detect a number of pixels in the object or the background for each linear area in the image:

specify the linear area in which the number of object is less than a threshold value, or the linear area in which the number of the background is equal to or more than the threshold value; and display the specified linear area identifiably on the image or divide the image into a plurality of images based on the specified linear area.

* * * * *